United States Patent [19]
Nose et al.

[11] 4,130,440
[45] Dec. 19, 1978

[54] SELF-CURABLE INORGANIC COMPOSITION

[75] Inventors: Shinji Nose, Kobe; Shingo Tokuda, Nishinomiya, both of Japan

[73] Assignee: Osaka Soda Co., Ltd., Osaka, Japan

[21] Appl. No.: 856,324

[22] Filed: Dec. 1, 1977

[30] Foreign Application Priority Data

Nov. 8, 1977 [JP] Japan .................. 52-134367

[51] Int. Cl.$^2$ .................. C04B 35/16; C09J 1/02
[52] U.S. Cl. .................. 106/74; 106/84
[58] Field of Search .................. 106/74, 84

[56] References Cited

U.S. PATENT DOCUMENTS

| 2,883,723 | 4/1959 | Moore et al. | 106/74 |
| 3,050,796 | 8/1962 | Moore | 106/74 |
| 3,868,258 | 2/1975 | Tomikawa et al. | 106/74 |

FOREIGN PATENT DOCUMENTS

| 52-58070 | 5/1977 | Japan | 106/74 |
| 52-71523 | 6/1977 | Japan | 106/74 |

Primary Examiner—O. R. Vertiz
Assistant Examiner—Mark Bell
Attorney, Agent, or Firm—Sherman and Shalloway

[57] ABSTRACT

A self-curable inorganic composition consisting of
(A) an alkali silicate as a binder,
(B) about 30 to about 300% by weight, based on the solids content of the binder (A), of a hardener composed of (i) 100 parts by weight of a compound selected from the group consisting of calcium sulfite and calcium thiosulfate, (ii) about 50 to about 300 parts by weight of calcium silicate, (iii) about 40 to about 300 parts by weight of zinc oxide, and (iv) 0 to about 150 parts by weight of an aluminum-containing inorganic compound selected from the group consisting of aluminum hydroxide, alumina and hydrated alumina,
(C) 0 to about 20% by weight, based on the weight of the composition in the uncured state, of another additive selected from the group consisting of coloring agents, thickeners, water repellents, curing retarders, dispersants, defoamers and levelling agents, and
(D) 0 to about 80% by weight, based on the weight of the composition in the uncured state, of a filler, aggregate or reinforcing material.

9 Claims, No Drawings

SELF-CURABLE INORGANIC COMPOSITION

This invention relates to a self-curable inorganic composition comprising an alkali silicate as a binder and a hardener therefor which is suitable for forming a coating of superior properties by application on the surfaces of various substrates.

More specifically, the invention relates to a self-curable inorganic composition comprising an alkali silicate as a binder and a hardener therefor, which has a suitable pot life and can form a coating of good adhesion strength in the absence of a primer by application on the surfaces of various substrates, such as a wide variety of buildings and building materials, for example inorganic silicate materials such as concrete walls, mortar walls, concrete blocks, asbestos slate boards, calcium silicate boards and cemented excelsior boards and gypsum boards and wooden or metallic building materials such as plywood and metal plates. The coating formed has superior water resistance, superior durability against repeated cycles of cooling and heating, low water absorption, low water permeability, superior weatherability, good acid resistance, good salt water resistance, good organic solvent resistance, resistance to chalking, non-combustibility, mechanical strength characteristics such as superior bending strength or pressure resistance, and non-toxicity.

Many suggestions have been made in the past about self-curable inorganic compositions comprising an alkali silicate as a binder, a hardener therefor, and optionally, fillers, aggregate and other additives. It has been extremely difficult however to provide a cheap and readily available self-curable inorganic composition which can form a firmly bonded coating layer having satisfactory properties on a wide variety of substrates. Although it has been known that a self-curable composition can be prepared from a combination of an alkali silicate, a hardener therefor and other optional ingredients, mere mixing of these ingredients cannot afford a composition having the desirable properties described hereinabove. In addition, in spite of the fact that the properties of compositions resulting from changes in the combination vary unpredictably, there has been no theoretical guideline which can be utilized in anticipating the effects of a given combination on the properties of the resulting composition. It has been the usual practice in the art therefore to select the combination of the constituent materials and their amounts on a trial-and-error basis. Usually, an attempt to impart a certain desirable property results in the unnegligible deterioration of one or more desirable properties.

The present inventors worked on a self-curable inorganic composition composed of an alkali silicate as a binder and calcium sulfite and/or calsium thiosulfate as a hardener. The work led to the discovery that a self-curable inorganic composition having the aforesaid superior properties can be obtained by using a specified amount of a specified hardener for the alkali silicate, which is composed of (1) calcium sulfite, calcium thiosulfate or both, (2) calcium silicate, and (3) zinc oxide, and preferably (4) aluminum hydroxide, alumina, hydrated alumina or a mixture of at least two of these aluminum compounds as an optional ingredient.

Some suggestions have heretofore been known as to self-curable inorganic compositions composed of an alkali silicate as a binder and a combination of calcium sulfite and calcium silicate as a hardener (see, for example, Japanese Laid-Open Patent Publication No. 58070/77 published on May 13, 1977, and Japanese Laid-Open Patent Publication No. 71523/77 published on June 15, 1977). Investigations of the present inventors have shown however that the use of a hardener consisting of calcium sulfite and calcium silicate in combination for the alkali silicate binder gives unsatisfactory properties as shown hereinbelow by Comparative Examples. For example, the composition has so short a pot life as to be usable only for a limited period of time, and the resulting coating is susceptible to cracking upon repeated cycles of cooling and heating, and develops a chalking phenomenon (by which a white powder is formed on the surface of the coating by the leaching of alkali after a lapse of time).

It has now been found in accordance with this invention that a self-curable inorganic compound having satisfactory levels of these and other properties can be obtained advantageously by using a hardener which consists of (i) 100 parts by weight of a compound selected from the group consisting of calcium sulfite and calcium thiosulfate, (ii) about 50 to about 300 parts by weight of calcium silicate, (iii) about 40 to about 300 parts by weight of zinc oxide, and (iv) 0 to about 150 parts by weight of an aluminum containing inorganic compound selected from the group consisting of aluminum hydroxide, alumina and hydrated alumina.

Japanese Laid-Open Patent Publication No. 58070/77, cited hereinabove, for example, discloses the use of 100 parts by weight of calcium sulfite and 15 parts by weight of zinc oxide per 200 parts by weight of alumina cement. This specification does not show the use of these hardener compounds for the alkali silicate. Furthermore, the amount of the zinc oxide is outside the range specified in (iii) above of the composition of this invention. As will be shown hereinbelow by Comparative Examples, if the amount of zinc oxide is below the limit specified in (iii) above, the results are unsatisfactory because of the shortening of the pot life and the occurrence of chalking.

It is an object of this invention to provide a self-curable inorganic composition comprising an alkali silicate as a binder and a hardener therefor which can form a coated layer of superior adhesion strength in the absence of a primer on a substrate, the coated layer having a superior water resistance, superior durability to repeated cycles of cooling and heating, low water absorption, low water permeability, superior weatherability, good acid resistance, good salt water resistance, good organic solvent resistance, good resistance to chalkint, non-combustibility, superior mechanical strength, non-toxicity and an adequate pot life.

The above and other objects of the invention along with its advantages will be more apparent from the following description.

The self-curable inorganic composition of this invention consists of (A) an alkali silicate as a binder, (B) about 30 to about 300% by weight, preferably about 40 to about 250% by weight, more preferably about 60 to about 200% by weight, based on the solids content of the binder (A), of a hardener composed of (i) 100 parts by weight of a compound selected from the group consisting of calcium sulfite and calcium thiosulfate, (ii) about 50 to about 300 parts by weight, preferably about 60 to about 250 parts by weight, more preferably about 70 to about 200 parts by weight, of calcium silicate, (iii) about 40 to about 300 parts by weight, preferably about 50 to about 250 parts by weight, more preferably about 60 to about 200 parts by weight, of zinc oxide, and (iv) 0 to about 150 parts by weight of an aluminum-containing inorganic compound selected from the group consisting of aluminum hydroxide, alumina and hydrated alumina, (C) 0 to about 20% by weight, based on the weight of the composition in the uncured state, of another additive selected from the group consisting of coloring agents, thickeners, water repellents, curing retarders, dispersants, defoamers and levelling agents, and (D) 0 to about 80% by weight, based on the weight of the composition in the cured state, of a filler, aggregate or reinforcing material.

If any one of the hardener ingredients (i), (ii) and (iii) is absent or the amount of the ingredient (iii) is below about 40 parts by weight per 100 parts by weight of the hardener ingredient (i), the composition of the invention has a shortened pot life and develops a chalking phenomenon to an unnegligible extent.

The total amount of the hardener ingredients (ii) and (iii) is at least 100 parts by weight, preferably about 150 to about 500 parts by weight, per 100 parts by weight of the hardener ingredient (i). If the total amount is less than 100 parts by weight, the wet strength of the composition decreases, and it tends to develop chalking. If the total amount exceeds about 500 parts by weight, the water resistance and weatherability of the composition tend to be reduced.

The preferred ratio of the hardener ingredient (ii) to the hardener ingredient (iii) is 1: about 0.1–about 6.

The absence of ingredient (i) in the composition of this invention markedly retards the rate of curing and causes poor curing at room temperature. The properties, such as water resistance, wet strength and weatherability, of the composition are also deteriorated. Hence, the use of the hardener ingredient (i) is essential. The suitable amount of the hardener (i) is about 10 to about 50% by weight based on the total amount of the hardener components. If the amount is less than about 10% by weight, the curability of the composition is poor, and the water resistance and weatherbility of the composition are deteriorated. If, on the other hand, the amount exceeds about 50% by weight, curing is too fast, and the pot life is shortened. Furthermore, the ratio of shrinkage of the composition at the time of curing increases, and cracks tend to occur.

If the amount of the hardener ingredient (ii) is less than the specified limit, the water resistance, wet resistance and weatherability of the composition tend to be deteriorated. If the amount exceeds the upper limit, the pot life is shortened. Hence, the suitable amount of the hardener ingredient (ii) is about 50 to about 300 parts by weight, preferably about 60 to about 250 parts by weight, more preferably about 70 to about 200 parts by weight, per 100 parts by weight of the hardener component (i).

If the amount of the hardener ingredient (iii) is smaller than the specified limit, the pot life is shortened, and chalking tends to occur. If it exceeds the specified limit, curing is poor, and the water resistance, wet strength and washing resistance of the composition tend to be deteriorated. The suitable amount of the hardener ingredient (iii) is therefore about 40 to about 300 parts by weight, preferably about 50 to about 250 parts by weight, more preferably about 60 to about 200 parts by weight, per 100 parts by weight of the hardener ingredient (i).

The composition of this invention optionally contains up to about 150 parts, preferably up to about 100 parts, by weight of an additional hardener ingredient (iv) which is aluminum hydroxide, alumina, hydrated alumina, or a mixture of at least two of these. If the amount of the hardener ingredient (iv) exceeds about 150 parts by weight, the water resistance and wet strength of the composition are very likely to be deteriorated. The use of the hardener ingredient (iv) in suitable amounts serves to reduce the shrinkage of the composition during hardening and inhibit crack formation, and often gives favorable results.

The hardener ingredient (i) is calcium sulfite, calcium thiosulfate, or both. It may be in the form of industrial wastes containing such a compound as a main ingredient (more than about 70% by weight). An example of such wastes is an absorption waste precipitate which is formed at the time of desulfurization of exhaust smokes using slaked lime, and which contains a large quantity of calcium sulfite.

The hardener ingredient (ii) is calcium silicate which may be in the form of an industrial waste containing calcium silicate as a main ingredient (at least about 70 % by weight). The industrial waste may be a slag obtained by water cooling and pulverizing a basic slag melt discharged from an iron-making blast furnace.

The hardener ingredient (iv) may also be in the form of industrial wastes containing aluminum hydroxide, alumina, hydrated alumina, or a mixture of at least two of these as a main ingredient (more than about 70% by weight). An example of the industrial waste is a sludge consisting mainly of aluminum hydroxide which is obtained by precipitation from a waste liquor generated at the time of surface treatment of aluminum.

The composition of this invention optionally contains (C) another additive and (D) a filler, aggregate, or reinforcing material.

The amount of the other additive (C) is up to about 20% by weight, based on the weight of the composition, of a member selected from the group consisting of coloring agents, thickeners, water repellents, curing retarders, dispersants, defoamers and levelling agents.

Examples of the coloring agents are inorganic pigments of the metal oxide type such as titanium oxide, iron oxide, chromium oxide, cadmium oxide and cobalt oxide, and organic pigments such as carbon black.

Examples of the thickeners are water-soluble polymers such as methyl cellulose, sodium polyacrylate and polyvinyl alcohols.

Examples of the water repellents are silicone emulsions, metal soaps such as aluminum stearate, and paraffins.

Examples of the dispersants are ligninsulfonic acid salts, naphthalenesulfonic acid salts, melamine-type sulfonic acid salts, and polyoxyetheylene ether.

Examples of the defoamers are silicone emulsions and glycol derivatives.

Examples of the levelling agents are ligninsulfonic acid salts and naphthalenesulfonic acid salts as in the case of the dispersants.

Examples of the curing retarders are aluminum phosphate and alkali silicofluorides.

The filler as component (D) may include, for example, talc, diatomaceous earth, kaolin, potter's earth, and finely divided calcium carbonate.

Examples of the aggregate are perlite, silica sand, calcium carbonate (coarse particles), hollow microspheres (e.g., Microballoon), vermiculite, pulverized products of glass, and pulverized products of ceramics.

Examples of the reinforcing material are asbestos, rockwool, glass fibers, pulp, and other fibrous materials.

The amount of the filler, aggregate or reinforcing material (D) is up to about 80 parts by weight. The use of component (D) in an amount exceeding about 80% by weight is not preferred because it will deteriorate the strength, water resistance, water permeability and weatherability of the composition.

The amount of the hardener (B) [the sum of hardener components (i) to (iv)] is about 30 to about 300% by weight, preferably about 40 to about 250% by weight, more preferably about 60 to about 200% by weight, based on the solids content of the alkali silicate binder (A). If the amount of component (B) is smaller than the specified limit, curing is poor, and the various properties of the composition such as water resistance and wet strength are markedly deteriorated. If, on the other hand, the amount exceeds the specified limit, the pot life is shortened, and troubles will occur in applying or processing the composition.

The filler used as component (D) preferably contains at least about 50% by weight of particles having a size of about 1 to about 200 microns. The aggregate used as component (D) preferably contains at least about 50% by weight of particles having a size of 50 to 4 mesh (Tyler's mesh). When the reinforcing material is used, it may be in the form of long fibers having a length of 0.1 mm to several cm.

The self-curable inorganic composition of this invention is useful for forming a coating having the aforesaid superior properties on various substrates such as concrete, mortar, concrete blocks, light-weight concrete boards, asbestos cement boards, cemented excelsior boards, light-weight asbestos boards, calcium silicate boards, gypsum boards, iron sheets, zinc-coated iron sheets, aluminum sheets, wooden plates, and plywoods. It can also be used as an admixture for cement or mortar to promote curing, prevent chalking, improve water resistance, etc.

If components (A) and (B) are pre-mixed and stored, the pot life of the composition will be affected. Hence, these components are mixed in situ. Mixing is sometimes effected at room temperature, and any mixing means can be used. If desired, components (C) and (D) may be pre-mixed with the component (A) and (B). Or they may be mixed in situ.

The composition of this invention may be applied by any coating method such as spraying, roller coating or trowel coating.

As stated hereinabove, the composition of this invention exhibits feasible properties when applied to the surfaces of various substrates. It may also be formed into fabricated articles such as boards or blocks by, for example, casting into molds.

The composition of the invention has self-curability at room temperature. By heating the composition during or after curing, some properties such as water resistance can be further improved.

The following Examples and Comparative Examples illustrate the present invention specifically.

The various properties shown in these examples were evaluated by the following methods.

(a) Pot life

Sprayer: The time which elapses until the amount of flow of the composition measured immediately after mixing of the ingredients by means of a flow meter (stipulated in JIS A 6907) decreases to half.

Trowel coating: The time during which a coating operation is possible.

Molded article: The time during which casting is possible.

The suitable pot life is about 60 minutes to about 120 minutes.

(b) Water resistance

Three days after the application of the coating composition, the sample was dipped in water for 1 hour, and then, (1) the surface condition was evaluated visually, and (2) the sample was subjected to a pencil hardness test. The evaluation of the pencil hardness was made on the following scale.
Excellent: 9H or more
Good: 5B to 8H
Poor: 6B or less

(c) Durability to repeated cycles of cooling and heating

Three days after the application of the coating composition, the sample was left to stand in a constant temperature tank at 80° C. for 16 hours, and then in a constant temperature tank at −20° C. for 8 hours. This cycle was repeated 10 times, and then, the surface of the sample was evaluated visually.

(d) Wet strength

Three days after the application of the coating composition, the sample was dipped in water at 20° C. for 1 hour. Then, it was subjected to a tensile strength test using a BRI (Building Research Institute method) tensile tester.

(e) Water permeability

Three days after the application of the coating composition, a water column with a diameter of 75 mm and a height of 250 mm was formed using a funnel-shaped glass tube with both ends opened. The amount of water which permeated through the sample during a 24-hour period was measured.

(f) Weatherability

The sample was exposed to a weather-Ometer for 1,000 hours, and then, the surface of the sample was evaluated visually.

(g) Washing resistance

In accordance with the washing resistance test stipulated in JIS A6909, the sample was subjected to brushing 1,000 times, and then its surface was evaluated visually.

(h) Salt water resistance

The sample was subjected for 48 hours to a salt spray test stipulated in JIS K5400, and then the surface of the sample was evaluated visually.

(i) Bending strength

Measured in accordance with JIS A1106.

(j) Compressive strength

Measured in accordance with JIS A1108

(k) Adhesion to a metal plate

The coating composition was applied to an aluminum plate. Three days later, the tensile strength of the coating was measured by a BRI method tensile tester.

EXAMPLES 1 AND 2 AND COMPARATIVE EXAMPLES 1 TO 4

Each of compositions having the formulations shown in Table I-1 was spray-coated on a slate board, and cured at 25° C. The properties of the coated boards obtained are shown in Table I-2.

Table I-1

| Example (Ex.) or Comparative Example (CEx.) | Ex. 1 | CEx. 1 | CEx. 2 | CEx. 3 | Ex. 2 | CEx. 4 |
|---|---|---|---|---|---|---|
| Hardener | | | | | | |
| $CaSO_3$ | 100 | 50 | 100 | 100 | 100 | 140 |
| $CaSiO_3$ | 60 | 60 | 20 | 60 | 230 | 230 |
| ZnO | 50 | 50 | 50 | 20 | 230 | 230 |
| Alkali silicate (sodium silicate No. 4, solids content 30%) | 550 | 410 | 440 | 460 | 1700 | 1800 |
| Pigment ($TiO_2$) | 40 | 30 | 35 | 35 | 120 | 130 |
| Aggregate (calcium carbonate) | 800 | 600 | 650 | 670 | 2500 | 2600 |

Table I-2

| Example (Ex.) or Comparative Example (CEx.) | Ex. 1 | CEx. 1 | CEx. 2 | CEx.3 | Ex. 2 | CEx. 4 |
|---|---|---|---|---|---|---|
| Pot life (sprayer, min.) | 90 | 230 | 100 | 20 | 120 | 80 |
| Water resistance | | | | | | |
|   Visual Observation | No change | Partly dissolved | Partly peeled | No change | No change | No change |
|   Pencil hardness | Excellent | Poor | Good | Excellent | Excellent | Excellent |
| Repeated cycle of cooling and heating | No change | No change | No change | Partly peeled | No change | Cracks formed on the entire surface |
| Wet strength (kg/cm$^2$) | 8.5 | Unmeasurable | 2.7 | 7.2 | 11.4 | 10.5 |
| Water permeability (ml/day) | 6.6 | above 20 | 6.0 | 4.5 | 3.2 | above 20 |
| Weatherability | No change | Surface peeled | Chalking | Partly cracked and chalking occurred | No change | Partly peeled |
| Wash resistance | No change | — | No change | — | No change | — |
| Salt water resistance | No change | — | — | — | No change | — |
| Adhesion to an aluminum plate (kg/cm$^2$) | 10.2 | 1.7 | 3.4 | 7.5 | 11.5 | 8.8 |

EXAMPLES 3 AND 4 AND COMPARATIVE EXAMPLES 5 TO 8

Each of compositions having the formulations shown in Table II-1 was spray-coated onto a slate board, and cured at 25° C. The properties of the coated boards are shown in Table II-2.

Table II-1

| Example (Ex.) and Comparative Example (CEx.) | CEx. 5 | CEx. 6 | Ex. 3 | CEx. 7 | Ex. 4 | CEx. 8 |
|---|---|---|---|---|---|---|
| Hardener | | | | | | |
| $CaSO_3$ | 100 | 100 | 100 | 100 | 100 | 100 |
| $CaSiO_3$ | 340 | 230 | 60 | 60 | 230 | 230 |
| ZnO | 230 | 340 | 50 | 50 | 230 | 230 |
| $Al(OH)_3$ | None | None | 100 | 210 | 100 | 210 |
| Alkali silicate (sodium silicate No. 4, solids content 30%) | 1850 | 1850 | 800 | 1100 | 1950 | 2200 |
| Pigment ($TiO_2$) | 130 | 130 | 60 | 80 | 140 | 160 |
| Aggregate (calcium carbonte) | 2700 | 2700 | 1200 | 1600 | 2850 | 3200 |

Table II-2

| Example (Ex.) or Comparative Example (CEx.) | CEx. 5 | CEx. 6 | Ex. 3 | CEx. 7 | Ex. 4 | CEx. 8 |
|---|---|---|---|---|---|---|
| Pot life (sprayer, min.) | 30 | 130 | 100 | 60 | 100 | 110 |
| Water resistance | | | | | | |
|   Visual observation | Partly dissolved | Dissolved | No change | Partly dissolved | No change | Partly dissolved |
|   Pencil Hardness | Good | Poor | Excellent | Good | Excellent | Good |
| Repeated cycle of cooling and heating | Partly cracked | No change | No change | No change | No change | No change |
| Wet strength (kg/cm$^2$) | 12.3 | 2.8 | 8.4 | 4.0 | 11.5 | 4.8 |

Table II-2-continued

| Example (Ex.) or Comparative Example (CEx.) | CEx. 5 | CEx. 6 | Ex. 3 | CEx. 7 | Ex. 4 | CEx. 8 |
|---|---|---|---|---|---|---|
| Water permeability (ml/day) | 3.0 | — | 5.9 | 3.0 | 3.8 | 6.3 |
| Weatherability | No change | Surface stripped | No change | Color faded | No change | Color faded |
| Washing resistance | No change | Exposed | No change | — | No change | — |
| Salt water resistance | — | — | No change | — | No change | — |
| Adhesion to a metal plate (kg/cm$^2$) | 10.6 | 3.3 | — | — | — | — |

EXAMPLES 5 AND 6 AND COMPARATIVE EXAMPLES 9 AND 10

Each of compositions having the formulations shown in Table III-1 was roller-coated on a concrete substrate, and cured at ambient temperature (room temperature). The properties of the coated substrates are shown in Table III-2.

Table III-1

| Example (Ex.) or Comparative Example (CEx.) | Ex. 5 | Ex. 6 | CEx. 9 | CEx. 10 |
|---|---|---|---|---|
| Hardener | | | | |
| CaSO$_3$ | 100 | 100 | 100 | 100 |
| CaSiO$_3$ | 230 | 230 | 230 | 230 |
| ZnO | 230 | 230 | 230 | 230 |
| Al(OH)$_3$ | 100 | 100 | 100 | 100 |
| Alkali silicate (sodium silicate No. 3, solids content 40%) | 4600 | 730 | 9100 | 500 |
| Pigment (red iron oxide) | 95 | 15 | 180 | 10 |
| Silica sand (aggregate) | 9400 | 1500 | 18000 | 1000 |

Table III-2

| Example (Ex.) or Comparative Example (CEx.) | Ex. 5 | Ex. 6 | CEx. 9 | CEx. 10 |
|---|---|---|---|---|
| Pot life (roller coating minutes) | 150 | 70 | 240 | 30 |
| Water resistance | | | | |
|   Visual observation | No change | No change | Peeled | Partly peeled |
|   Pencil hardness | Excellent | Excellent | Poor | Excellent |
| Repeated cycle of cooling and heating | No change | No change | Entire surface peeled | Entire surface cracked |
| Wet strength (kg/cm$^2$) | 7.5 | 14.9 | 2.2 | 6.6 |
| Water permeablity (ml/day) | 8.7 | 1.8 | above 20 | above 20 |
| Weatherability | No change | No change | Entire surface peeled | Entire surface cracked |
| Washing resistance | No change | No change | Entire surface of the substrate exposed | — |
| Salt water resistance | No change | No change | Entire surface peeled | — |
| Adhesion to an aluminum plate (Kg/cm$^2$) | 8.1 | 13.5 | — | — |

EXAMPLES 7 TO 12

Each of compositions having the formulations shown in Table IV-1 was coated on each of the substrates shown in Table IV-1 by the methods shown in the table, and cured. The properties of the coated substrates are shown in Table IV-2.

Table IV-1

| Example | 7 | 8 | 9 | 10 | 11 | 12 |
|---|---|---|---|---|---|---|
| Hardener | | | | | | |
| CaSO$_3$ and/or CaS$_2$O$_3$ | CaSO$_3$ 100 | CaSO$_3$ 100 | CaSO$_3$ 50 CaS$_2$O$_3$ 50 | CaSO$_3$ 50 CaS$_2$O$_3$ 50 | CaS$_2$O$_3$ 100 | CaS$_2$O$_3$ 100 |
| CaSiO$_3$ | 100 | 150 | 180 | 100 | 180 | 150 |
| ZnO | 120 | 150 | 80 | 80 | 200 | 120 |
| Al(OH)$_3$, Al$_2$O$_3$, AlO(OH) | 120 | 60 (alumina) | None | 80 (hydrated alumina) | None | 100 |
| Alkali silicate | 1000 (potassium silicate, solids content 29%) | 1000 | No. 3: 750 Water: 250 | No. 3: 750 Water: 50 | No. 3: 750 Water: 100 | No. 3: 750 Water: 100 |
| Additive | | | Silicone repellent:15 | | | |
| Pigment | Ti white, 15 | Ti yellow, 2 | Iron yellow 10 | — | — | — |
| Aggregate | Silica sand 2700 | Perlite 500 | Silica sand 2250 | Calcium 1500 | Calcium (1100) | Calcium (1100) |
| Filler | Talc 300 | | Talc 250 | | | |
| Reinforcing material | | | | | Asbestos 5 | |
| Substrate | Light-weight foamed concrete board | — | Slate | Concrete | Slate | — |
| Method of application | Spraying | Casting | Roller coating | Trowel coating | Spraying | Casting |
| Method of curing | Room temp. | 80° C × 20 min. | Room temp. | Room temp. | Room temp. | Room temp. |

Table IV-2

| Example | 7 | 8 | 9 | 10 | 11 | 12 |
|---|---|---|---|---|---|---|
| Pot life (minutes) | 90 (sprayer) | 110 (molded article) | 120 (roller coating) | 120 (trowel coating) | 130 (sprayer) | 100 (molded article |
| Water resistance | | | | | | |
|   Visual observation | No chane | No change | No change | No change | No change | No change |
|   Pencil hardness | Excellent | Excellent | Excellent | Excellent | Excellent | Excellent |
| Repeated cycle of cooling and heating | No change | No change | No change | No change | No change | No change |
| Wet strength (kg/cm$^2$) | 9.1 | — | 9.5 | 7.8 | 8.7 | — |
| Water permeability (ml/day) | 3.3 | — | 8.0 | 7.5 | 8.5 | — |
| Weatherability | No change | No change | No change | No change | No change | No change |
| Washing resistance | No change | No change | No change | No change | No change | No change |
| Salt water resistance | No change | No change | No change | No change | No change | No change |
| Bending strength (kg/cm$^2$) | — | 31 | — | — | — | — |
| Compressive strength (kg/cm$^2$) | — | 86 | — | — | — | 240 |
| Adhesion to an aluminum plate (kg/cm$^2$) | 10.3 | — | — | — | 9.4 | — |

What we claim is:

1. A self-curable inorganic composition consisting of
   (A) an alkali silicate as a binder,
   (B) about 30 to about 300% by weight, based on the solids content of the binder (A), of a hardener composed of
      (i) 100 parts by weight of a compound selected from the group consisting of calcium sulfite and calcium thiosulfate,
      (ii) about 50 to about 300 parts by weight of calcuim silicate,
      (iii) about 40 to about 300 parts by weight of zinc oxide, and
      (iv) 0 to about 150 parts by weight of an aluminum-containing inorganic compound selected from the group consisting of aluminum hydroxide, alumina and hydrated alumina,
   (C) 0 to about 20% by weight, based on the weight of composition in the uncured state, of coloring agents, thickeners, water repellents, curing retarders, dispersants, defoamers or levelling agents, and
   (D) 0 to about 80% by weight, based on the weight of the composition in the uncured state, of a filler, aggregate or reinforcing material.

2. The self-curable inorganic composition of claim 1, which contains about 40 to about 250% by weight, based on the solids content of the binder (A), of the hardener (B) which is composed of
   (i) 100 parts by weight of calcium sulfite or calcium thiosulfate,
   (ii) about 60 to about 250 parts by weight of calcium silicate,
   (iii) about 50 to about 250 parts by weight of zinc oxide, and
   (iv) 0 to about 150 parts by weight of an aluminum-containing inorganic compound selected from the group consisting of aluminum hydroxide, alumina and hydrated alumina.

3. The self-curable inorganic composition of claim 1, which contains about 60 to about 200% by weight, based on the solids content of the binder (A), of the hardener (B) which is composed of
   (i) 100 parts by weight of calcium sulfite or calcium thiosulfate,
   (ii) about 70 to about 200 parts by weight of calcium silicate,
   (iii) about 60 to about 200 parts by weight of zinc oxide, and
   (iv) 0 to about 150 parts by weight of an aluminum-containing inorganic compound selected from the group consisting of aluminum hydroxide, alumina and hydrated alumina.

4. The self-curable inorganic composition of claim 1, wherein the total amount of the hardener ingredients (ii) and (iii) is about 150 to about 500 parts by weight, per 100 parts by weight of the hardener ingredient (i).

5. The self-curable inorganic composition of claim 4, wherein the ratio of hardener ingredient (ii) to hardener ingredient (iii) is 1: about 0.1–about 6.

6. The self-curable inorganic composition of claim 1 wherein component (C) is present.

7. The self-curable inorganic composition of claim 1 wherein component (D) is present.

8. The self-curable inorganic composition of claim 1 wherein both components (C) and (D) are present.

9. The self-curable inorganic composition of claim 1 wherein the aluminum-containing inorganic compound (iv) is present.